United States Patent Office 3,058,957
Patented Oct. 16, 1962

3,058,957
CROSS-LINKING VINYL ETHER POLYMERS WITH A SULFONAZIDE
David S. Breslow, Wilmington, Del., assignor to Hercules Powder Company, Wilmington, Del., a corporation of Delaware
No Drawing. Filed Jan. 31, 1961, Ser. No. 85,976
20 Claims. (Cl. 260—79.3)

This invention relates to cross-linking polymers and to the vulcanizates so produced. More particularly, the invention relates to cross-linking vinyl ether polymers and to the vulcanizates so produced.

It is known to vulcanize, i.e., cross-link, poly(vinyl methyl ether) with peroxides and sulfur. However, the above agents suffer the drawback that they are not equally effective in cross-linking all poly(vinyl alkyl ethers) and they give relatively poor results when covulcanizing poly-(vinyl alkyl ether) with another polymer.

Now, in accordance with this invention it has unexpectedly been found that any vinyl ether polymer can be cross-linked by heating in the presence of a polysulfonazide to produce a vulcanizate that is tough, resilient, solvent resistant, and odor free. In addition, the sulfonazide cross-linking agents can be used to covulcanize a vinyl ether polymer with another polymer.

Any polysulfonazide, i.e., any compound having the general formula

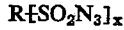

where R is an organic radical inert to the cross-linking reaction and $x$ is an integer greater than 1 can be used in the process of this invention. Most preferably, $x$ will be an integer of 2 to 150 and R will be selected from the group of organic radicals consisting of alkylene, arylene, aralkylene, alkarylene radicals, and their substituted derivatives. Exemplary sulfonazides are 1,5-pentane bis(sulfonazide), 1,10-decane bis(sulfonazide), 1,3-benzene bis(sulfonazide), 4,4'-diphenylmethane bis-(sulfonazide), 4,4',4''-triphenylmethane tris(sulfonazide), 4,4'-diphenyl ether bis(sulfonazide), 4,4'-diphenyl disulfide bis(sulfonazide), 1,6-bis(4'-sulfonazidophenyl) hexane, 2,7-naphthalene bis(sulfonazide), polystyrene polysulfonazide, the sulfonazidoacetate esters of 1,6-hexanediol, diethylene glycol, trimethylolpropane, thiodiglycol, etc.; the 2,2'-bis(sulfonazides) of diethyl ether, diethyl sulfide, etc.

Any vinyl ether polymer, homopolymer, or copolymer can be cross-linked by the process of this invention. Exemplary vinyl ether polymers are poly(vinyl methyl ether), poly(propenyl methyl ether), poly(vinyl ethyl ether), poly(propenyl ethyl ether), poly(vinyl butyl ether), poly(vinyl isobutyl ether), poly(vinyl propyl ether), poly(vinyl isopropyl ether), poly(vinyl allyl ether), poly(vinyl benzyl ether), poly(vinyl cyclohexyl ether), poly(vinyl 2-chloroethyl ether), poly(vinyl 2-methoxyethyl ether), poly(vinyl carbethoxymethyl ether), poly(1 - methoxybutadiene), poly(2 - ethoxybutadiene), poly(vinyl methyl ether-vinyl butyl ether), poly(vinyl methyl ether-vinyl 2-chloroethyl ether), etc. As stated above, any one of these polymers can be blended with another polymer such as poly(propylene oxide-allyl glycidyl ether), a polyester, a polyacrylate, etc., and covulcanized.

The cross-linking process of this invention can be carried out by heating the vinyl ether polymer in the presence of the polysulfonazide to a temperature at which the sulfonazide decomposes. This temperature varies over a wide range, but, in general, will be in the range of from about 75° C. to about 250° C. Various amounts of the cross-linking agent can be added, the optimum amount depending on the amount of cross-linking desired, the specific polysulfonazide employed, etc. In general, the amount added, based on the weight of the vinyl ether polymer, will be from about 0.1% to about 20%.

The cross-linking agent can be incorporated with the vinyl ether polymer in any desired fashion; for example, it can be uniformly blended by simply milling on a conventional rubber mill or dissolved in a solution containing the polymer. By either means the polysulfonazide is distributed throughout the polymer and uniform cross-linking is effected when the blend is subjected to heat. Other methods of mixing the cross-linking agent with the polymer will be apparent to those skilled in the art.

In addition to the cross-linking agent, other ingredients can also be incorporated. The additives commonly used in rubber vulcanizates can be used here also, as, for example, extenders, fillers, pigments, plasticizers, stabilizers, etc. Exemplary of the fillers that can be added are calcium carbonate, iron oxide, carbon black, silica, calcium silicate (hydrated), alumina, etc. The presence of a filler, and in particular carbon black, is beneficial in some cases. Obviously, there are many cases in which a filler is not required or desired and excellent results are achieved when only the cross-linking agent is added.

The following examples are presented for purposes of illustration, parts and percentages being by weight unless otherwise specified. The molecular weight of the polymers vulcanized in these examples is indicated by the reduced specific viscosity (RSV) given for each. By the term "reduced specific viscosity" is meant the $\eta_{sp/c}$ determined on a 0.1% solution (0.1 g. of the polymer per 100 ml. of solution) of the polymer.

The extent of cross-linking is determined by analysis for percent gain in insolubility in solvents in which the uncross-linked polymer is soluble, hereinafter termed "percent gel."

Percent gel is determined as follows: A weighed sample of polymer is soaked in a specified solvent for a specified length of time. The sample is then removed and dried to constant weight. The weights of initial and final sample are corrected for polymer and copolymer content based on knowledge of components. From these figures $$\frac{\text{corrected dry weight}}{\text{corrected initial weight}} \times 100 = \text{percent gel.}$$

EXAMPLE 1

1,3-benzene bis(sulfonazide) was prepared by reacting 1,3-benzene disulfonyl chloride with sodium azide. The resulting compound was used to cross-link a poly(vinyl methyl ether) having an RSV of 6.7, as determined in chloroform at 25° C., and being 32 percent crystalline as determined by infrared analysis. To 148 parts of chloroform were added 3 parts of the poly(vinyl methyl ether) and 0.15 part of 1,3-benzene bis(sulfonazide). The chloroform was removed by evaporation and the polymer cured by heating in an iron mold at 170° C. for 25 minutes. The resulting vulcanizate had a percent gel of 103 as determined by soaking in chloroform for 18 hours at room temperature. The uncross-linked poly(vinyl methyl ether) was completely soluble in chloroform.

EXAMPLE 2

Two samples of a poly(vinyl methyl ether) having an RSV of 4.5, as determined in chloroform at 25° C., were covulcanized with poly(propylene oxide-allyl glycidyl ether) using a 1,10-decane bis(sulfonazide) cross-linking agent and a dicumyl peroxide cross-linking agent respectively, and the properties of the respective vulcanizates were compared.

The bis(disulfonazide) was prepared as follows: 1,10-decanedithiol dissolved in a mixture of glacial acetic acid and water was treated with chlorine gas. The resulting 1,10-decane disulfonyl chloride was then reacted with sodium azide to give a good yield of high purity 1,10-decane bis(sulfonazide).

The two covulcanizations (called A and B for identification purposes) were carried out as follows: In each case 50 parts of poly(vinyl methyl ether) and 50 parts of poly(propylene oxide-allyl glycidyl ether) were dissolved in 1000 parts of a 2:1 methylene chloride-benzene mixture with agitation. Each solution was rapidly stripped of solvent by steam distillation to prevent selective precipitation; each blend was vacuum dried and then milled on a 2-roll mill at approximately 110° C. During the milling 50 parts of high abrasion furnace black were added to each blend, 3 parts of 1,10-decane bis(sulfonazide) were added to blend A, and 4 parts of dicumyl peroxide, 2 parts of tetramethylthiuram disulfide, 1 part of benzothiazyl disulfide, and 1 part of sulfur were added to blend B. Each blend was covulcanized in an iron mold at 170° C. for 40 minutes under 600 p.s.i. pressure. Each vulcanizate was then tested for tensile strength, modulus, elongation, Graves tear, percent water absorption, and percent gel as determined in hot toluene. The results of these tests are given in Table 1.

Table 1

|  | Vulcanizate A bis(sulfonazide) cure | Vulcanizate B peroxide cure |
| --- | --- | --- |
| Tensile Strength | 1,615 | 940 |
| Modulus at 100% Elongation, p.s.i. | 920 | 290 |
| Percent Elongation | 235 | 410 |
| Graves Tear Strength, p.s.i. | 185 | 100 |
| Percent Water Absorption [1] | 3.7 | 13.0 |
| Percent Gel [2] | 91 | 83 |

[1] Soaked in ice water one hour.
[2] Toluene at 80° C. for 4 hours.

EXAMPLES 3–7

Three samples of a slightly crystalline poly(vinyl methyl ether) having an RSV of 13.0, as determined in chloroform at 25° C., were cross-linked by heating in the presence of bis(sulfonazides). Two control samples of the sample polymer were subjected to the same conditions except no bis(sulfonazide) was added. All of the samples were then tested for percent gel.

The polymer samples were dissolved in chloroform, the sulfonazides added, and then the chloroform evaporated. The samples were cured as described in Example 1. The sulfonazides and the amounts used, the temperature and time of curing, and the percent gel are given in Table 2.

EXAMPLE 8

To 100 parts of chloroform were added 100 parts of a poly(vinyl ethyl ether) having an RSV of 3.2, as determined in chloroform at 25° C., and 5 parts of 1,3-benzene bis(sulfonazide). The chloroform was evaporated and the polymer cured in an iron mold at a temperature of 165° C. for 22 minutes. The resulting vulcanizate was substantially insoluble in hot toluene while a sample of the polymer subjected to the same conditions, except for the addition of the bis(sulfonazide), was completely soluble.

EXAMPLE 9

To 100 parts of chloroform were added 100 parts of a poly(vinyl isobutyl ether) having an RSV of 3.5, as determined in chloroform at 25° C., and 5 parts of 4,4'-diphenylether bis(sulfonazide). The chloroform was evaporated and the polymer cured in an iron mold at a temperature of 165° C. for 40 minutes. The resulting vulcanizate had a percent gel of 72 as determined by soaking in toluene at 80° C. for 4 hours. A sample of the polymer subjected to the same conditions, except for the addition of the bis(sulfonazide), was completely soluble in toluene at 80° C.

EXAMPLE 10

A poly(vinyl isopropyl ether) having an RSV of 29.1, as determined in chloroform at 25° C., was cross-linked using 5 parts of 1,10-decane bis(sulfonazide) per 100 parts of polymer as described in Example 9. The curing temperature was 185° C. and the time was 26 minutes. The resulting vulcanizate had a percent gel of 92 as determined by soaking in toluene at 80° C. for 4 hours and 85.6 as determined by soaking in chloroform for 18 hours at room temperature. A sample of the polymer subjected to the same conditions, except for the addition of the bis(sulfonazide), was substantially soluble in hot toluene and completely soluble in chloroform.

EXAMPLE 11

To 100 parts of hot tetrachloroethylene were added 3 parts of a poly(propenyl ethyl and ether) having an RSV of 3.4 as determined in toluene at 50° C., and 0.3 parts of 1,10-decane bis(sulfonazide). The tetrachloroethylene solvent was removed in vacuo and the polymer pressed between steel plates at a temperature of 200° C. for 30 minutes under a pressure of 1000 p.s.i. The resulting vulcanized polymer sheet was no longer soluble in hot tetrachloroethylene.

EXAMPLES 12–14

Three vinyl ether polymers were cross-linked by heating in the presence of bis(sulfonazides) as follows: Five parts of each polymer were dissolved in 100 parts of methylene chloride. To each solution was added a bis(sulfonazide) with agitation. The methylene chloride solvent was removed in vacuo and each polymer cured in an iron mold. The polymers, and the RSV of each, the sulfonazides, the amounts used, and the temperature and time of curing are given in Table 3. Each of the resulting vulcanizates was insoluble in methylene chloride.

Table 2

| Example No. | Bis(Sulfonazide) Cross-Linking Agent | Parts of Cross-Linking Agent/ 100 Parts of Poly(Vinyl Methyl Ether) | Temp., °C. | Time, (Min.) | Percent Gel Toluene [1] | Percent Gel Chloroform [2] |
| --- | --- | --- | --- | --- | --- | --- |
| 3 | 2,7-naphthalene bis(sulfonazide) | 5 | 165 | 40 | 95.3 | 99.3 |
| 4 | 4,4'-diphenylether bis(sulfonazide) | 5 | 165 | 40 | 99.4 | 100.3 |
| 5 | 1,10-decane bis(sulfonazide) | 5 | 185 | 25 | 92.1 | 86.6 |
| 6 |  | None | 165 | 40 | Completely Soluble | |
| 7 |  | None | 185 | 25 | Completely Soluble | |

[1] 4 hours at 80° C.
[2] 18 hours at room temperature.

| Example No. | Polymer | RSV [1] | Bis(sulfonazide) | Amount | Time, (Min.) | Temp., °C. |
|---|---|---|---|---|---|---|
| 12 | Poly(vinyl methyl ether vinyl 2-chloroethyl ether).[2] | 3.3 | 1,3-benzene | 0.5 | 15 | 170 |
| 13 | Poly(vinyl 2-chloroethyl ether) | 3.5 | 2,7-naphthalene | 0.25 | 45 | 160 |
| 14 | Poly(vinyl 2-methoxyethyl ether) | 2.1 | 1,10-decane | 0.25 | 30 | 180 |

[1] Determined in chloroform at 25° C.
[2] Containing 41 mole percent vinyl 2-chloroethyl ether.

EXAMPLE 15

To 100 parts of chloroform were added 5 parts of a poly(vinyl 2-chloroethyl ether-vinyl allyl ether) containing 15 mole percent vinyl allyl ether and having an RSV of 2.0, as determined in chloroform at 25° C., and 0.15 part of 4,4′,4″-triphenylmethane-tris(sulfonazide). The chloroform was removed in vacuo and the polymer cured in an iron mold at a temperature of 165° C. for 30 minutes. The resulting vulcanize was insoluble in chloroform.

EXAMPLE 16

To 100 parts of chloroform were added 5 parts of a poly(1-methoxybutadiene) having an RSV of 2.0, as determined in chloroform at 25° C., and 0.25 part of the bis(sulfonazidoacetate) ester of 1,6-hexanediol. The chloroform was removed in vacuo and the polymer cured in an iron mold at a temperature of 155° C. for 40 minutes. The resulting vulcanizate was insoluble in chloroform.

What I claim and desire to protect by Letters Patent is:

1. The process of cross-linking a mono vinyl ether polymer which comprises heating said polymer in the presents of a polysulfonazide cross-linking agent having the formula $$R[SO_2N_3]_x$$

wherein R is an inert organic radical which does not prevent cross-linking of the polymer and $x$ is an integer in the range of 2 to 150.

2. The process of claim 1 wherein the polymer is a homopolymer.
3. The process of claim 2 wherein the homopolymer is a poly(vinyl alkyl ether).
4. The process of claim 3 wherein the homopolymer is poly(vinyl methyl ether).
5. The process of claim 2 wherein the homopolymer is poly(vinyl 2-chloroethyl ether).
6. The process of claim 2 wherein the homopolymer is poly(vinyl 2-methoxyethyl ether).
7. The process of claim 1 wherein the polymer is a copolymer.
8. The process of claim 1 wherein the polysulfonazide cross-linking agent is 1,3-benzene bis(sulfonazide).
9. The process of claim 1 wherein the polysulfonazide cross-linking agent is 1,10-decane bis(sulfonazide).
10. The process of claim 1 wherein the polysulfonazide cross-linking agent is 2,7-naphthalene bis(sulfonazide).
11. The process of claim 1 wherein the polysulfonazide cross-linking agent is 4,4-diphenylether bis(sulfonazide).
12. The process of claim 1 wherein the polysulfonazide cross-linking agent is 4,4,4″-triphenylmethane-tris(sulfonazide).
13. The process of claim 1 wherein the polysulfonazide cross-linking agent is this bis(sulfonazidoacetate) ester of 1,6-hexanediol.
14. A mono vinyl ether polymer cross-linked with a polysulfonazide cross-linking agent having the formula $$R[SO_2N_3]_x$$

where R is an inert organic radical which does not prevent crosss-linking of the polymer and $x$ is an integer in the range of 2 to 150.

15. The product of claim 14 wherein the polymer is a homopolymer.
16. The product of claim 15 wherein the homopolymer is a poly(vinyl alkyl ether).
17. The product of claim 16 wherein the homopolymer is poly(vinyl methyl ether).
18. The product of claim 15 wherein the homopolymer is poly(vinyl 2-chloroethyl ether).
19. The product of claim 15 wherein the homopolymer is poly(vinyl 2-methoxyethyl ether).
20. The product of chair 14 wherein the polymer is a copolymer.

References Cited in the file of this patent

UNITED STATES PATENTS 2,467,280    Walter _____ Apr. 12, 1949

UNITED STATES PATENT OFFICE
CERTIFICATE OF CORRECTION

Patent No. 3,058,957                        October 16, 1962

David S. Breslow

It is hereby certified that error appears in the above numbered patent requiring correction and that the said Letters Patent should read as corrected below.

Column 3, Table 1, heading to the third column thereof, for "Vulcanizate B perioxide cure" read -- Vulcanizate B peroxide cure --; same column 3, line 53, for "sample" read -- same --; column 4, line 40, strike out "and"; columns 5 and 6, add "Table 3" over the table; column 5, line 35, for "presents" read -- presence --; line 38, strike out "inert"; column 6, line 21, for "4,4-diphenylether" read -- 4,4'-diphenylether --; line 23, for "4,4.,4"-" read -- 4,4',4"- --; line 26, for "this" read --: the --; line 32, strike out "inert"; same column 6, line 45, for "chair" read -- claim --.

Signed and sealed this 19th day of March 1963.

(SEAL)
Attest:

ESTON G. JOHNSON
Attesting Officer

DAVID L. LADD
Commissioner of Patents